(12) United States Patent
Ooshima et al.

(10) Patent No.: US 7,039,480 B2
(45) Date of Patent: May 2, 2006

(54) PLANNING OPERATION MANAGEMENT SUPPORT SYSTEM, AND PLANNING OPERATION MANAGEMENT SUPPORT PROGRAM

(75) Inventors: Nobuhiro Ooshima, Tokyo (JP); Hitoshi Kobayashi, Tokyo (JP); Katsutoshi Nishiguchi, Yokkaichi (JP); Hirokatsu Matsudaira, Yokkaichi (JP)

(73) Assignees: Toshiba Solutions Corporation, Tokyo (JP); Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 11/086,226

(22) Filed: Mar. 23, 2005

(65) Prior Publication Data

US 2005/0216111 A1 Sep. 29, 2005

(30) Foreign Application Priority Data

Mar. 25, 2004 (JP) ............................ P2004-090630

(51) Int. Cl.
*G06F 19/00* (2006.01)
(52) U.S. Cl. ............................ 700/97; 700/99; 700/100
(58) Field of Classification Search .................. 700/95, 700/97, 99, 100, 101, 102; 705/7, 8, 9, 27
See application file for complete search history.

(56) References Cited

U.S. PATENT DOCUMENTS

| | | | | |
|---|---|---|---|---|
| 5,313,392 | A | * | 5/1994 | Temma et al. ................ 705/27 |
| 5,442,561 | A | * | 8/1995 | Yoshizawa et al. ......... 700/100 |
| 2003/0050065 | A1 | | 3/2003 | Alletson et al. |
| 2003/0171963 | A1 | * | 9/2003 | Kurihara et al. .............. 705/7 |

FOREIGN PATENT DOCUMENTS

| | | |
|---|---|---|
| JP | 6-12544 | 1/1994 |
| JP | 9-138823 | 5/1997 |
| JP | 11-120239 | 4/1999 |
| JP | 2000-347717 | 12/2000 |
| JP | 2001-134313 | 5/2001 |

OTHER PUBLICATIONS

Combined Search and Examination Report, issued by the British Patent Office for British Application No. GB0505639.5, dated May 19, 2005.
http://www.microsoft.com/resources/documentation/project/2002/all/reskit/en-us/prk_glossary_3553.mspx.

* cited by examiner

*Primary Examiner*—Leo Picard
*Assistant Examiner*—Charles Kasenge
(74) *Attorney, Agent, or Firm*—Finnegan, Henderson, Farabow, Garrett & Dunner, L.L.P.

(57) ABSTRACT

A project template information management database 1 of a planning operation management support system includes: database groups from 20 to 23 saving setting information of planning operations performed in the past, names of process flows in the respective layers (task name), lead times (lead time) required for the respective process flows (task), and dependency relations between the process flows (task), as templates by the respective customers; a result database 15 storing trading results with customers in the past; and a calendar database 16 storing calendar information setting actual working days when workers in charge of the respective process flows carry on a work, and holidays. A client terminal 4 includes: an input device 35 inputting new project names, customer names, and delivery dates; and a CPU41 calling a corresponding customer's template from the project template information management database 1 by inputting the customer name, the name of the new project, and the delivery date, creating a new project information, and displaying the Gantt chart on the screen.

10 Claims, 18 Drawing Sheets

10 PROJECT INFORMATION DB

| PROJECT NUMBER | NAME OF CUSTOMER | DELIVERY DATE |
|---|---|---|
| 0000001 | A COMPANY | 2004/2/28 |
| 0000002 | B COMPANY | 2004/3/10 |
| 0000003 | C COMPANY | 2004/3/31 |

FIG. 3

11 WBS MANAGEMENT DB

| FIRST HIERARCHY | SCHEDULED START DATE | SCHEDULED COMPLETION DATE | LEAD TIME | START DATE | COMPLETION DATE | PROGRESS RATE |
|---|---|---|---|---|---|---|
| PHASE A | | | 9 | | | |

| SECOND HIERARCHY | SCHEDULED START DATE | SCHEDULED COMPLETION DATE | LEAD TIME | START DATE | COMPLETION DATE | PROGRESS RATE |
|---|---|---|---|---|---|---|
| PROCESS A | | | 5 | | | |
| PROCESS B | | | 8 | | | |

| THIRD HIERARCHY | SCHEDULED START DATE | SCHEDULED COMPLETION DATE | LEAD TIME | START DATE | COMPLETION DATE | PROGRESS RATE |
|---|---|---|---|---|---|---|
| TASK A1 | | | 2 | | | |
| TASK A2 | | | 2 | | | |
| TASK A3 | | | 1 | | | |
| TASK B1 | | | 3 | | | |
| TASK B2 | | | 1 | | | |
| TASK B3 | | | 2 | | | |
| TASK B4 | | | 4 | | | |

FIG. 4

12 PARENT-CHILD RELATION DB

| PARENT | CHILD |
|---|---|
| 0000001 | PHASE A |
| PHASE A | PROCESS A |
| PROCESS A | TASK A1 |
| PROCESS A | TASK A2 |
| PROCESS A | TASK A3 |
| PROCESS B | TASK B1 |
| PROCESS B | TASK B2 |
| PROCESS B | TASK B3 |
| PROCESS B | TASK B4 |

FIG. 5

13 DEPENDENCY RELATION DB

| FORMER | LATTER |
|---|---|
| TASK A1 | TASK A2 |
| TASK A2 | TASK A3 |
| TASK B2 | TASK B3 |

FIG. 6

2004/2 CALENDAR
SUN.MON.TUE.WED.THU.FRI.SAT.
(1) 2 3 4 5 6 (7)
(8) 9 10 (11) 12 13 (14)
(15) 16 17 18 19 20 (21)
(22) 23 24 25 26 27 (28)
(29)

2004/3 CALENDAR
SUN.MON.TUE.WED.THU.FRI.SAT.
1 2 3 4 5 (6)
(7) 8 9 10 11 12 (13)
(14) 15 16 17 18 (19) (20)
(21) 22 23 24 25 26 (27)
(28) 29 30 31

FIG. 7

20 PROJECT INFORMATION DB

| PROJECT | SCHEDULED START DATE | DELIVERY DATE | LEAD TIME |
|---|---|---|---|
| TEMP0000001 | 2003/10/6 | 2003/10/20 | 9 |

21 WBS MANAGEMENT DB

| FIRST HIERARCHY | SCHEDULED START DATE | SCHEDULED COMPLETION DATE | LEAD TIME | START DATE | COMPLETION DATE | PROGRESS RATE | EVALUATION |
|---|---|---|---|---|---|---|---|
| PHASE A | 2003/10/6 | 2003/10/18 | 9 | 2003/10/8 | 2003/10/17 | - | A |

| SECOND HIERARCHY | SCHEDULED START DATE | SCHEDULED COMPLETION DATE | LEAD TIME | START DATE | COMPLETION DATE | PROGRESS RATE | EVALUATION |
|---|---|---|---|---|---|---|---|
| PROCESS A | 2003/10/8 | 2003/10/11 | 5 | 2003/10/8 | 2003/10/16 | - | C |
| PROCESS B | 2003/10/12 | 2003/10/19 | 8 | 2003/10/12 | 2003/10/18 | - | A |

| THIRD HIERARCHY | SCHEDULED START DATE | SCHEDULED COMPLETION DATE | LEAD TIME | START DATE | COMPLETION DATE | PROGRESS RATE | EVALUATION |
|---|---|---|---|---|---|---|---|
| TASK A1 | 2003/10/8 | 2003/10/9 | 2 | 2003/10/8 | 2003/10/12 | - | C |
| TASK A2 | 2003/10/9 | 2003/10/10 | 2 | 2003/10/12 | 2003/10/13 | - | B |
| TASK A3 | 2003/10/11 | 2003/10/11 | 1 | 2003/10/14 | 2003/10/16 | - | B |
| TASK B1 | 2003/10/12 | 2003/10/14 | 3 | 2003/10/12 | 2003/10/14 | - | S |
| TASK B2 | 2003/10/16 | 2003/10/16 | 1 | 2003/10/15 | 2003/10/15 | - | A |
| TASK B3 | 2003/10/16 | 2003/10/17 | 2 | 2003/10/16 | 2003/10/16 | - | B |
| TASK B4 | 2003/10/18 | 2003/10/19 | 4 | 2003/10/17 | 2003/10/18 | - | S |

S···EXECUTED EXTREMELY EFFICIENTLY
A···EXECUTED AS SCHEDULED
B···EXECUTED A LITTLE BEHIND SCHEDULE
C···SPEND A LOT OF TIME

22 PARENT-CHILD RELATION DB

| PARENT | CHILD |
|---|---|
| 000001 | PHASE A |
| PHASE A | PROCESS A |
| PROCESS A | TASK A1 |
| PROCESS A | TASK A2 |
| PROCESS A | TASK A3 |
| PROCESS B | TASK B1 |
| PROCESS B | TASK B2 |
| PROCESS B | TASK B3 |
| PROCESS B | TASK B4 |

23 DEPENDENCY RELATION DB

| FORMER | LATTER |
|---|---|
| TASK A1 | TASK A2 |
| TASK A2 | TASK A3 |
| TASK B2 | TASK B3 |

FIG. 8

RESULT OF DESIGNED SCHEDULE AUTOMATIC CREATION

| PROJECT | SCHEDULED START DATE | DELIVERY DATE |
|---|---|---|
| 0000002 | 2004/3/2 | 2004/3/12 |

(1)

| FIRST HIERARCHY | SCHEDULED START DATE | SCHEDULED COMPLETION DATE | LEAD TIME | START DATE | COMPLETION DATE | PROGRESS RATE |
|---|---|---|---|---|---|---|
| PHASE A | | 2004/3/12 | | | | |

(2)

| FIRST HIERARCHY | SCHEDULED START DATE | SCHEDULED COMPLETION DATE | LEAD TIME | START DATE | COMPLETION DATE | PROGRESS RATE |
|---|---|---|---|---|---|---|
| PHASE A | | 2004/3/12 | 9 | | | |

(3)

| FIRST HIERARCHY | SCHEDULED START DATE | SCHEDULED COMPLETION DATE | LEAD TIME | START DATE | COMPLETION DATE | PROGRESS RATE |
|---|---|---|---|---|---|---|
| PHASE A | 2004/3/2 | 2004/3/12 | 9 | | | |

DESIGNED SCHEDULE TEMPLATE

| PROJECT | SCHEDULED START DATE | DELIVERY DATE |
|---|---|---|
| TEMP0000001 | 2004/2/2 | 2004/2/13 |

| FIRST HIERARCHY | SCHEDULED START DATE | SCHEDULED COMPLETION DATE | LEAD TIME | NUMBER OF DAYS UNTIL DELIVERY DATE | START DATE | COMPLETION DATE | PROGRESS RATE |
|---|---|---|---|---|---|---|---|
| PHASE A | | | 9 | 0 | | | |

① SET TRACED BACK DATE TO SCHEDULED COMPLETION DATE FOR NUMBER OF DAYS FROM SCHEDULED COMPLETION DATE TO DELIVERY DATE 2004/3/12 (SCHEDULED COMPLETION DATE OF PROJECT) - 0 (ZERO) DAY (NUMBER OF DAYS FROM DELIVERY DATE)

| FIRST HIERARCHY | SCHEDULED START DATE | SCHEDULED COMPLETION DATE | LEAD TIME | NUMBER OF DAYS UNTIL DELIVERY DATE | START DATE | COMPLETION DATE | PROGRESS RATE |
|---|---|---|---|---|---|---|---|
| PHASE A | | | 9 | 0 | | | |

② SET L/T

| FIRST HIERARCHY | SCHEDULED START DATE | SCHEDULED COMPLETION DATE | LEAD TIME | NUMBER OF DAYS UNTIL DELIVERY DATE | START DATE | COMPLETION DATE | PROGRESS RATE |
|---|---|---|---|---|---|---|---|
| PHASE A | | | 9 | 0 | | | |

③ CALCULATE START DATE BY TRACING BACK DATE FOR NUMBER OF DAYS OF L/T FROM SCHEDULED COMPLETION DATE (EXCEPT HOLIDAYS SET IN CALENDAR)

FIG. 9

Left side tables (Phase 2A):

| FIRST HIERARCHY | SCHEDULED START DATE | SCHEDULED COMPLETION DATE | LEAD TIME | START DATE | COMPLETION DATE | PROGRESS RATE |
|---|---|---|---|---|---|---|
| PHASE 2A | 2004/3/2 | 2004/3/12 | 9 | | | |

| SECOND HIERARCHY | SCHEDULED START DATE | SCHEDULED COMPLETION DATE | LEAD TIME | START DATE | COMPLETION DATE | PROGRESS RATE |
|---|---|---|---|---|---|---|
| SUB PHASE 2A | 2004/3/2 | 2004/3/5 | 5 | | | |
| SUB PHASE 2B | 2004/3/3 | 2004/3/13 | 8 | | | |

| THIRD HIERARCHY | SCHEDULED START DATE | SCHEDULED COMPLETION DATE | LEAD TIME | START DATE | COMPLETION DATE | PROGRESS RATE |
|---|---|---|---|---|---|---|
| TASK 2A1 | 2004/3/2 | 2004/3/4 | 2 | | | |
| TASK 2A2 | 2004/3/4 | 2004/3/5 | 2 | | | |
| TASK 2A3 | 2004/3/6 | 2004/3/6 | 1 | | | |
| TASK 2B1 | 2004/3/3 | 2004/3/5 | 3 | | | |
| TASK 2B2 | 2004/3/5 | 2004/3/5 | 1 | | | |
| TASK 2B3 | 2004/3/8 | 2004/3/9 | 2 | | | |
| TASK 2B4 | 2004/3/9 | 2004/3/12 | 4 | | | |

| PARENT | CHILD |
|---|---|
| 0000002 | PHASE 2A |
| PHASE 2A | PROCESS 2A |
| PROCESS 2A | TASK 2A1 |
| PROCESS 2A | TASK 2A2 |
| PROCESS 2A | TASK 2A3 |
| PROCESS 2B | TASK 2B1 |
| PROCESS 2B | TASK 2B2 |
| PROCESS 2B | TASK 2B3 |
| PROCESS 2B | TASK 2B4 |

| FORMER | LATTER |
|---|---|
| TASK 2A1 | TASK 2A2 |
| TASK 2A2 | TASK 2A3 |
| TASK 2B2 | TASK 2B3 |

Right side tables (Phase A):

| FIRST HIERARCHY | SCHEDULED START DATE | SCHEDULED COMPLETION DATE | LEAD TIME | NUMBER OF DAYS UNTIL DELIVERY DATE | START DATE | COMPLETION DATE | PROGRESS RATE |
|---|---|---|---|---|---|---|---|
| PHASE A | | | 9 | 0 | | | |

| SECOND HIERARCHY | SCHEDULED START DATE | SCHEDULED COMPLETION DATE | LEAD TIME | NUMBER OF DAYS UNTIL DELIVERY DATE | START DATE | COMPLETION DATE | PROGRESS RATE |
|---|---|---|---|---|---|---|---|
| SUB PHASE A | | | 5 | 5 | | | |
| SUB PHASE B | | | 8 | 0 | | | |

| THIRD HIERARCHY | SCHEDULED START DATE | SCHEDULED COMPLETION DATE | LEAD TIME | NUMBER OF DAYS UNTIL DELIVERY DATE | START DATE | COMPLETION DATE | PROGRESS RATE |
|---|---|---|---|---|---|---|---|
| TASK A1 | | | 2 | 7 | | | |
| TASK A2 | | | 2 | 5 | | | |
| TASK A3 | | | 1 | 4 | | | |
| TASK B1 | | | 3 | 5 | | | |
| TASK B2 | | | 1 | 5 | | | |
| TASK B3 | | | 2 | 3 | | | |
| TASK B4 | | | 4 | 0 | | | |

| PARENT | CHILD |
|---|---|
| 0000001 | PHASE A |
| PHASE A | PROCESS A |
| PROCESS A | TASK A1 |
| PROCESS A | TASK A2 |
| PROCESS A | TASK A3 |
| PROCESS B | TASK B1 |
| PROCESS B | TASK B2 |
| PROCESS B | TASK B3 |
| PROCESS B | TASK B4 |

| FORMER | LATTER |
|---|---|
| TASK A1 | TASK A2 |
| TASK A2 | TASK A3 |
| TASK B2 | TASK B3 |

FIG. 10

| TASK NAME | PERSON IN CHARGE | START DATE | COMPLETION DATE | 3/1 | 3/2 | 3/3 | 3/4 | 3/5 | 3/6 | 3/7 | 3/8 | 3/9 | 3/10 | 3/11 | 3/12 | 3/13 |
|---|---|---|---|---|---|---|---|---|---|---|---|---|---|---|---|---|
| PHASE A | | 2003/03/1 | 2003/03/17 | | | | | | | | | | | | | |
| PROCESS A | USER 01 | | | | | | | | | | | | | | | |
| TASK A1 | USER 01 | | | | | | | | | | | | | | | |
| TASK A2 | USER 01 | | | | | | | | | | | | | | | |
| TASK A3 | USER 01 | | | | | | | | | | | | | | | |
| PROCESS B | USER 02 | | | | | | | | | | | | | | | |
| TASK B1 | USER 02 | | | | | | | | | | | | | | | |
| TASK B2 | USER 02 | | | | | | | | | | | | | | | |
| TASK B3 | USER 03 | | | | | | | | | | | | | | | |
| TASK B4 | USER 03 | | | | | | | | | | | | | | | |

PLANNING OPERATION MANAGEMENT SUPPORT SYSTEM, AND PLANNING OPERATION MANAGEMENT SUPPORT PROGRAM

CROSS-REFERENCE TO RELATED APPLICATIONS

This application is based upon and claims the benefit of priority from the prior Japanese Patent Application No. 2004-90630, filed on Mar. 25, 2004; the entire contents of which are incorporated herein by reference.

BACKGROUND

1. Field of the Invention

The present invention relates to an art concerning a management support of planning operation, for example, a production planning, an operation planning, a project management, and so on, and particularly to a planning operation management support system, and a planning operation management support program supporting for revising an already created plan when some modifications are occurred to the planning operation created once.

2. Description of the Related Art

Conventionally, in planning operations such as a production planning, an operation planning, a project management (hereinafter, referred to as "planning operation"), it is not a rare case that a Gantt chart is used for a progress management. The Gantt chart means a band-shaped graph used for a management of staffs or process flows in factories, or the like, and time is disposed in a horizontal axis, and staffs, manufacturing facilities, or the like, is disposed in a vertical axis, to show information such as individual work start dates, and work completion dates by the respective process flows, in band shapes. Further, in some process flows, there is a case when an intermediate fabrication manufactured by a certain process flow is further processed in another process flow. This cross relationship may be clearly specified by arrows from the work completion date of a former work to the work start date of the following work.

As a conventional progress management method in design and development, it was necessary for a manager of a project, such as a project manager, to define entire work item of the corresponding project at first and set lead times of the respective work items on a computer, when a process planning of a project is created (for example, refer to Japanese Patent Laid-open Application No. Hei 9-138823).

Besides, when a delivery deadline of an objective product of delivery (hereinafter, referred to as "delivery date") is suddenly. changed, and a necessity of shortening a delivery date is occurred, the project manager conventionally has to edit with adjusting lead times of the respective work items manually with referring to the created Gantt chart.

As stated above, in a progress management method of process flows in production, development, and so on, using a conventional Gantt chart, parameters such as the respective work items, periods are inputted and created in each time, and therefore, it takes not a little work hours to define the respective work items, and in addition, there is a case when some leakage occurs in the necessary work items of the respective projects, when a new project is established.

Besides, when the new project is established, it is well conceivable to divert a data of a past project, but it is required to correct numeric values such as a parameter value of a period required for the respective work items to be inputted again, and it takes a time for this work. Therefore, there is a problem that it differs little from creating the Gantt chart newly in an overall labor.

Further, in case when a change of a delivery date is occurred suddenly while the project is in progress, it was impossible for the project manager to make an accurate correction of the process flows considering actual working days, and so on, although it is possible to correct the process planning roughly by adjusting the working period of the respective work items in the Gantt chart created by him/herself or an affiliate.

SUMMARY

The present invention is made to solve the above-described problems, and the object thereof is to provide a planning operation management support system and a planning operation management support program in which a Gantt chart without any leakage of work items can be created easily when a project is established, and a correction of a process planning can be performed accurately and easily.

To solve the above-stated problems, the planning operation management support system which manages multilayer process flows in a planning operation according to one aspect of the present invention, including: a template information storage storing setting information of a planning operation performed in past times, a name of process flow of the respective layers, a lead time required for the respective process flows, and dependency relation between the process flows, as a template by the respective planning operations; a trading result information storage storing trading result information with a customer in past times by the respective planning operations; a calendar storage storing calendar information in which actual working day when a worker in charge of the respective process flows carries on a work and holiday are set by the respective planning operations; an input unit accepting an input of a name of the customer, a name of the planning operation, and a delivery date to the customer, as a condition to make a process planning of a new planning operation; a template calling unit calling the template of the planning operation stored in the template information storage with reference to the trading result information stored in the trading result information storage, when the name of the customer, the name of the planning operation, and the delivery date are accepted by the input unit; a setting unit setting the name of the planning operation and the delivery date to the template called by the template calling unit; a completion date calculating unit calculating a completion date of an entire process flow of the new planning operation based on the delivery date set in the template, the setting information showing a number of days from a completion of the process planning to the delivery date set in the template in advance, and the calendar information of the calendar storage; a planning operation information. creation unit creating information of the new planning operation by allocating the respective process flows based on the completion date, the lead time of the respective process flows set in the template in advance, and the calendar information, and by calculating back a start date of the new planning operation; and a Gantt chart display unit displaying a Gantt chart on a screen based on the information of the new planning operation created by the planning operation information creation unit.

Besides, the planning operation management support system according to another aspect of the present invention, further including: an adjustment bar display unit displaying an adjustment bar which performs a change of the delivery date to the Gantt chart displayed on the screen; a first reallocation unit searching for not-processed process flows in a hierarchy falling within a date when the adjustment bar is moved to the arbitrary date on the Gantt chart, calculating a number of days of searched individual process flows with reference to the calendar information with actual working day, calculating a lead time as an entire hierarchy by adding up the number of days of the calculated respective process flows, calculating a new lead time of the respective process flows based on the lead time of the entire hierarchy and a number of shifted days, and reallocating the respective process flows with the calculated lead time.

Besides, the planning operation management support system according to still another aspect of the present invention, further including: a second reallocation unit performing a reallocation of the process flows reallocated by the first reallocation unit by searching for a task having a long lead time from a topside, subtracting the lead time of the searched task for one day, when the process flows are not accommodated in the changed delivery date as a result of the reallocation of the process flows by the first reallocation unit.

Further, the planning operation management support system according to still another aspect of the present invention, further including: a planning operation information copy unit inserting a specified other work plan to the Gantt chart showing the information of the new planning operation, when the existing other work plan of the planning operation is specified while editing the information of the new planning operation created by the planning operation information creation unit.

Besides, the planning operation management support system according to yet another aspect of the present invention, further including: a planning operation information link unit linking the information of the new planning operation created by the planning operation information creation unit with the other planning operation information; and a linked planning operation information display unit displaying the other planning operation information linked by the planning operation information link unit to the Gantt chart showing the information of the new planning operation in parallel.

A planning operation management support program for operating a planning operation management support system which manages multilayer process flows in a planning operation according to an aspect of the present invention, the program makes the planning operation management support system perform functions including: a template information storage function storing setting information of a planning operation performed in past times, a name of process flows of the respective layers, a lead time required for the respective process flows, and a dependency relation between the process flows, as a template by the respective planning operations; a trading result information storage function storing trading result information with a customer in past times by the respective planning operations; a calendar storage function storing calendar information in which actual working day when a worker in charge of the respective process flows carries on a work and holiday are set; an input function accepting an input of a name of the customer, a name of planning operation, and a delivery date to the customer, as a condition to make a process planning of a new planning operation; a template calling function calling the template of the planning operation stored in the template information storage function with reference to the trading result information stored in the trading result information storage function, when the name of the customer, the name of the planning operation, and the delivery date are accepted by the input function; a setting function setting the name of the planning operation and the delivery date to the template called by the template calling function; a completion date calculating function calculating a completion date of an entire process flow of the new planning operation based on the delivery date set in the template, the setting information showing a number of days from a completion of the process planning to the delivery date set in the template in advance, and the calendar information of the calendar storage function; a planning operation information creation function creating information of the new planning operation by allocating the respective process flows based on the completion date, the lead time of the respective process flows set in the template in advance, and the calendar information, and calculating back a start date of the new planning operation; and a Gantt chart display function displaying a Gantt chart on a screen based on the information of the new planning operation created by the planning operation information creation function.

In the planning operation management support system and the planning operation management support program according to the aspect of the present invention, information of a planning operation delivered to a customer having a result in the past are saved in advance as a template by planning operations, and when a new planning operation is established, a user only inputs a customer, a name of a planning operation, a delivery date to the customer, and thereby, a Gantt chart displaying a scheduling of an entire process flow of the new planning operation can be created easily. Further, in the planning operation management support system and the planning operation management support program according to another aspect of the present invention, the new planning operation information is created in accordance with the calendar information in which actual working days when the user carries on the work and holidays are set, and therefore, a process planning of the planning operation according to a situation of the customer can be created easily and accurately.

In addition to these, when the created planning operation is reviewed, or when a request is accepted from a customer to shorten a delivery date of a required product, and so on, while the planning operation is executing, the Gantt chart of the corresponding processing planning operation at the time the request is accepted are displayed on the screen, and the adjustment bar is moved from the original scheduled delivery date to the changed delivery date by a drag and drop operation, and thereby, the respective process flows of the processing project are reallocated automatically so as to be accommodated in the moved date. Therefore, energies for the reallocation of the process flows conventionally required can be reduced.

Besides, when a progress schedule of work items of the planning operation (refer to later-described FIG. 7) is newly created, and an appropriate template does not exist, desired information of a work plan is copied from the existing work plans in the planning operations to be inserted to the editing work plan, and thereby, the new business plan can be created easily.

Further, when it is required to link the created progress schedule of work items of the planning operation with the other progress schedule of work items of the planning operation, it is possible to link these two progress schedules, and therefore, the progress schedule of an associated planning operation can be confirmed while a certain planning operation is carrying on.

As described above, according to the present invention, it is possible to create a Gantt chart without any leakage of work items easily when a project is established, and a correction of the work plan can be performed accurately and easily.

BRIEF DESCRIPTION OF THE DRAWINGS

FIG. 3 is a view showing a WBS management DB of the planning operation management support system in FIG. 1.

FIG. 4 is a view showing a parent-child relation DB of the planning operation management support system in FIG. 1.

FIG. 5 is a view showing a dependency relation DB of the planning operation management support system in FIG. 1.

FIG. 6 is a view showing a calendar DB of the planning operation management support system in FIG. 1.

FIG. 7 is a view showing a template saved in a project template information management DB of the planning operation management support system in FIG. 1.

FIG. 8 is a view showing a scheduling creation procedure to create project information from a called template at a client terminal of this planning operation management support system.

FIG. 9 is a view showing new project information created from the template.

FIG. 10 is a view showing an example of the new project information displayed as a Gantt chart.

DESCRIPTION OF THE EMBODIMENTS

Figure 1:
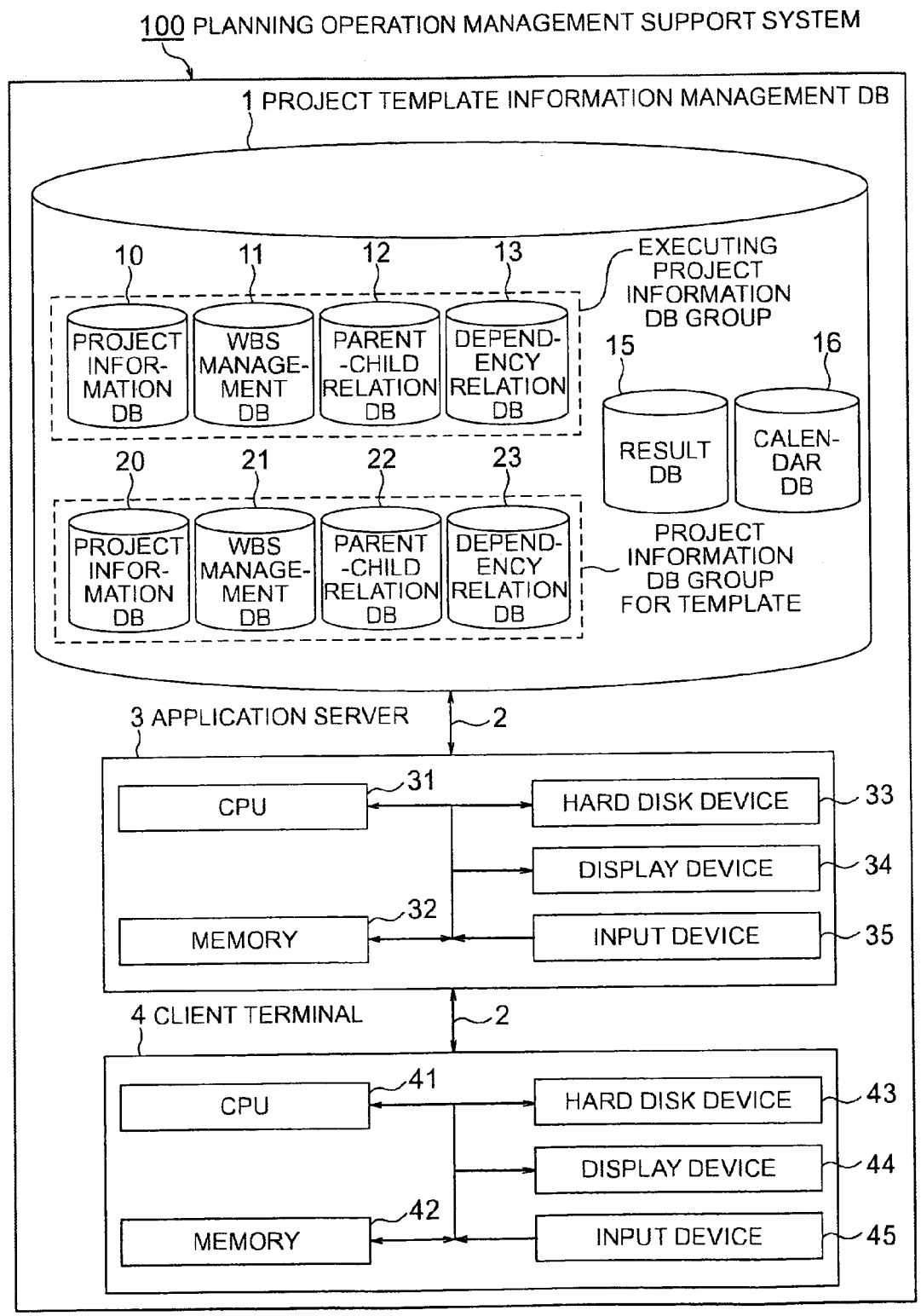
FIG. 1 is a view showing a configuration of a planning operation management support system according to one embodiment of the present invention.

Hereinafter embodiments of the present invention are described with reference to drawings. FIG. 1 is a view showing a configuration of a planning operation management support system according to one embodiment of the present invention. As shown in FIG. 1, this planning operation management support system 100 includes a project template information management database 1 (hereinafter, denoted by "management DB1"), an application server 3 connected to this management DB1 via a network such as a LAN2, and a client terminal 4 connected to this application server 3 via the network such as the LAN2. The management DB1 includes a database group of a project information database 10 (hereinafter, denoted by "project information DB10"), a WBS management database 11 (hereinafter, denoted by "WBS management DB11"), a parent-child relation database 12 (hereinafter, denoted by "parent-child relation DB12"), a dependency relation database 13 (hereinafter, denoted by "dependency relation DB13"), a result database 15 (hereinafter, denoted by "result DB15A), and a calendar database 16 (hereinafter, denoted by "calendar DB16"). Similarly, the management DB1 includes a database group of a project information DB20, a WBS management DB21, a parent-child relation DB22, and a dependency relation DB23.

The application server 3 and the client terminal 4 includes a CPU31, a CPU41, a memory 32, a memory 42, a hard disk device 33, a hard disk device 43, a display device 34, a display device 44, such as a monitor having a display screen, and an input device 35, an input device 45 such as a mouse and a keyboard. On the hard disk device 33 of the application server 3, a server software is installed in addition to an operation system (not shown. hereinafter, denoted by "OS"). The server software enables later-described functions on the CPU31 by operating together with the OS.

Namely, the CPU31 includes a project information calling function calling project information as a planning operation, a project information registration function, a template calling function, a template registration function, a history management function, and so on. The project information calling function is a function to call a data relating to a project (refer to later-described FIG. 2) saved in the project information DB10, to spread out to the memory 32. The project information registration function is a function to register project information to the result DB15 in the management DB1. The object of the "registration" described here is the result relating to a later-described WBS, and it is registered to the result DB15. The template calling function is a function to call a template from the management DB1. The template registration function is a function to register the template to the management DB1. The history management function is a function to historically manage a result of adjustment of a delivery date of a project as process flows of a delivery date before correction and a delivery date after correction, and to evaluate the process flows after adjustment when the project is completed.

Besides, in the hard disk device 43 of the client terminal 4, a client software is installed in addition to the OS. The client software includes a batch correction function of a lead time, an information calling/saving function, a project information creation function, a clock function (calendar function), a Gantt chart display and edit function, and a history management function.

The batch correction function of a lead time is a function to change information of such as a schedule to satisfy the respective process flows by calculating back from a moved period (including an expanded period or a reduced period) and a moved shifted date, when the adjustment bar on the vertical axis of the Gantt chart (refer to FIG. 11, FIG. 12) displayed on the display screen is move operated with a drag-and-drop by a user as a batch. The information calling/saving function is functions to call information of the project information, the template information, and so on, from the management DB1, and to save edited information to the management DB1.

The project information creation function is a function to create a new process planning, namely project information from information of a project number and a completion date inputted by a user, and information of a specified customer, and information of a template stored in the management DB1. The clock function (calendar function) is a function to clock a month, date, time, minute, and second by using a function of the OS.

The Gantt chart display and edit function is a function to display information such as the project information, the template information called from the management DB1, and the edited project information, as a Gantt chart.

The history management function is a function to redefine a history to the management DB1 preferentially, having a high evaluation for the changed process flows, among the histories when created project information is called again to change tasks, as a template for a scheduling automatic creation of next time. The scheduling automatic creation is a function to create a scheduling of a project, and so on, automatically based on various information registered in the management DB1, when a delivery date of a trading product requested by a customer is changed.

As stated above, the management DB1 includes a database group of the project information DB10, the WBS management DB11, the parent-child relation DB12, the dependency relation DB13, the result DB15, the calendar DB16, the project information DB20, the WBS management DB21, the parent-child relation DB22, and the dependency relation DB23. These respective DBs are provided by the respective planning operations. In the result DB15, the project information as created results is registered.

It is represented that the project information DB10, the WBS management DB11, the parent-child relation DB12, and the dependency relation DB13 are DBs used when the planning operation management support system 100 according to the present invention logically executes necessary processes in the application server 3. On the contrary, the project information DB20, the WBS management DB21, the parent-child relation DB22, and the dependency relation DB23 are DBs relating to the project information used as the template.

Here, the WBS (Work Breakdown Structure) is one of a method used when a plan is made in a project management, and it is a structure in which an entire project is divided into small work items. In the WBS, at first, the results of the project are broken down into as small unit as possible. At that time, the whole project is divided into large units, and thereafter, the respective portions are divided into smaller units, and they are hierarchically structured. After the segmentation of the results is finished, necessary works (it is not limited to one work) to constitute the respective portions are considered, and they are disposed at the bottom layer.

The project information DB10, the WBS management DB11, the parent-child relation DB12, and the dependency relation DB13 are database group managing the executing project information. The project information DB20, the WBS management DB21, the parent-child relation DB22, and the dependency relation DB23 are database group managing the project information for templates. In the management DB1, these two kinds of database groups are included by classified broadly.

Figure 2:
FIG. 2 is a view showing a project information DB of the planning operation management support system in FIG. 1.

As shown in FIG. 2, in the project information DB10, names of customers (customer name) and delivery dates of trading products are correspondingly stored by the respective project numbers, namely, by the respective planning operations.

As shown in FIG. 3, in the WBS management DB11, as for a first hierarchy (large development process flow), for example, as a name of "phase A", a scheduled start date, a scheduled completion date, a lead time, a start date, a completion date, a progress rate, and so on, are stored with corresponding to the name of the phase. Besides, as for a second hierarchy (middle development process flow) belonging to just under the first hierarchy, for example, as names of "process A", "process B", a scheduled start date, a scheduled completion date, a lead time, a start date, a completion date, a progress rate, and so on, are stored with corresponding to the name of the process. Further, as for a third hierarchy (small development process flow) belonging to just under the second hierarchy, for example, as names of "task A1", "task B1", a scheduled start date, a scheduled completion date, a lead time, a start date, a completion date, a progress rate, and so on, are stored with corresponding to the name of the task. Namely, in this WBS management DB11, information of a work period, a work schedule, a progress rate of each task, and so on, by the respective hierarchies such as phase/process/task are stored. Further, as it is described later based on FIG. 7, in the WBS management DB21 referred to as a template of a scheduling of a newly created planning operation, in addition to items stored in the above-described WBS management DB11, evaluations inputted for the respective work items of the respective projects (for example, when it is executed as scheduled, evaluated as "A", when it is executed a little behind schedule, evaluated as "B", when an amount of work is large, the work items are very hard, and it took a lot of time, evaluated as "C", further, when the work item has a very high importance, requires a tension, and it cannot help being executed efficiently, evaluated as "S") are stored, as a result that a manager such as a project manager actually operated a project.

As shown in FIG. 4, in the parent-child relation DB12, the relation between parent and child of a project number as being at the head, a phase, a process flow, and a task are stored. The parent-child relation mentioned here is to represent dependency relations between the respective work items, for example, when the phase is a parent, the process flow is a child, and when the task is a child, the process flow is a parent. Further, in FIG. 4, only the parent-child relation between the respective work items (phase, process, task) is described, but it may be a parent-child-grandchild relation DB showing a parent-child-grandchild relation (not shown). In this case, it can be seen that when a phase is a parent, a task is in a grandchild relation.

As shown in FIG. 5, in the dependency relation DB13, for example, a dependency relation between the respective work items is stored, showing a former and latter relation between a task to be executed previously and a task to be executed subsequently, representing which one of two tasks is necessary to be carried on in advance, and subsequently, it is surely necessary to carry on this task.

The result DB15 is a database to store the result of a development process flow chart created by a later-described planning operation information creation process relating to a certain project (refer to a later-described WBS management DB21 in FIG. 7), and it is constituted by the same structure as the WBS management DB21 in FIG. 7. Here, the result concretely means that a start date, a completion date of work items, evaluations by a project manager for project information concerning the project, and so on. Besides, this result DB15 may be integrally constituted with the WBS management DB21. In this case, when a template of a planning operation is read, the WBS management DB21 and the result DB15 are referenced. Hereinafter, the result DB15 and the WBS management DB21 are explained as being logically separated databases.

As shown in FIG. 6, in the calendar DB16, calendar information by the respective planning operations is stored, in which working days (actual working day) when members attending the project (participant) actually carry on the work of the project, and holidays when the members do not carry on the work are shown. This is because it is not a rare case that specific holidays by each customer are set, and it is unique information to the planning operation, and therefore, it is to adjust the actual working days of the members attending to the planning operation.

Subsequently, operation of this planning operation management support system 100 is described. In this planning operation management support system 100, various templates are prepared in the management DB1 in advance to make a creation of a Gantt chart showing process flows relating to the planning operation easy, and the template of the corresponding planning operation is read out from the client terminal 4, and thereby, a scheduling is created automatically in accordance with a delivery date. In the template, as shown in FIG. 7, a lead time of the respective work items, a number of days until the delivery date to a customer, a parent-child relation between the respective work items, and a dependency relation of the respective work items are set. The client terminal 4 creates the scheduling from the information of the template called from the management DB1.

That is to say, this planning operation management support system 100 includes: the management DB1 including the database groups from 20 to 23 of the project information for the templates as a template information storage means storing setting information of the planning operations performed with customers in the past, names of process flows of the respective layers (task name), lead times required for the respective process flows (task), dependency relations between the process flows (task), by every planning operation as templates by the respective planning operationes, the WBS management DB21 (also refer to the result DB15 if necessary) as a trading results information storage means storing trading results information with the customers in the past, and the calendar DB16 as a calendar storage means storing the calendar information in which the actual working days when workers responsible for each task perform activities, and holiday are set; and the client terminal 4 including the input device 35 as an input means accepting inputs of the customers, the project names, the delivery dates to the customers as conditions to make a process planning of a new project, the CPU41 creating information of the new project by calling the template of the corresponding customer from the management DB1 when the customer, the project name, the delivery date are accepted by the input device 35, and the display device 45 as a Gantt chart display means displaying the Gantt chart on the screen based on the information of the new project created by the CPU41.

When the customer, the name of planning operation, and the delivery date are inputted from the input device 45, the CPU41 of the client terminal 4 includes: a template calling function calling the template of the planning operation from the database groups from 20 to 23 of the project information for the templates with reference to the trading results information in the WBS management DB21 and the result DB15 of the management DB1; a function setting the name of the planning operation and the delivery date to the called template by this template calling function; a completion date calculating function asking for the completion date of the whole task of the new project from the delivery date set in the template, the setting information showing the number of days from the process planning completion to the delivery date set in the template in advance (refer to FIG. 10, and FIG. 14 to FIG. 16) and the calendar information in the calendar DB16; a planning operation information creation function creating information of the new project by allocating the respective tasks into the actual working days except holidays which are already set, based on the completion date, the lead time of the respective tasks set in the template in advance, and the information of the calendar, and thereby, calculating back the start date of the new project; and a function displaying the Gantt chart on the screen of the display device 44 based on the information of the new project created by the planning operation information creation function.

Further, the CPU41 of the client terminal 4 functions as a means displaying an adjustment bar 50 performing a change of the delivery date to the Gantt chart displayed on the screen of the display device 44; and a first reallocation means searching for not-processed tasks in the hierarchy falling within the date when the adjustment bar 50 is moved by a drag and drop to an arbitrary date on the Gantt chart by a mouse operation of a user, calculating the number of days of the searched individual tasks with reference to the calendar information in the calendar DB16, calculating a lead time as an entire hierarchy by adding up the calculated number of days of the respective tasks, calculating a new lead time by the respective tasks from the lead time of the entire hierarchy and a number of shifted days, and reallocating the respective tasks into the calculated lead time.

Further, the CPU41 of the client terminal 4 functions as a means performing a reallocation of the process flows made by the first reallocation means, by searching for a task having a long lead time from a topside, subtracting the lead time of the searched task for one day, when the task is not accommodated in the moved delivery date as a result of the reallocation of the task by the first reallocation means. Incidentally, a value of one day can be changed into, for example, 0.5 day, 2 days, or the like, by a setting change of a parameter.

Further, the CPU41 of the client terminal 4 functions as a planning operation information copying means in which while the project information is editing for a new creation of a project, and so on, an inserting position is specified, and thereafter, phase/process/task of the existing other project are read and displayed on the screen by referring to the project information stored in the WBS management DB21 and the result DB15, a desired range within the phase/process/task of the displayed existing other project or the phase/process/task is specified, and then, they are inserted into the insert specified position of the project currently editing. Namely, the CPU41 functions as the means inserting the specified phase/process/task into the Gantt chart of the currently editing project, when the phase/process/task of the existing other project are specified while the project information is editing.

Further, the CPU41 of the client terminal 4 has a planning operation information link function in which when a plurality of project information (information of phase/process/task) are created, these project information are linked. This means that, for example, when a part of a project information among a certain project information is out sourced to an external agency (outsourcing company), the out sourced project information is linked with the outsourcer's project information. Further, the CPU41 of the client terminal 4 functions as a linked planning operation information displaying means in which the linked other project information is displayed in parallel on the Gantt chart displaying the project information being an object of the link. If it is exemplified with the above example, the outsourcer's project information and the outsourced project information are displayed on the same screen.

Hereinafter, a scheduling creation procedure in the client terminal 4 is described. In this client terminal 4, the project manager starts up a client software installed in the client terminal 4 of him/herself by a mouse operation, and so on, and then, a menu screen (not shown) of the planning operation management support system is displayed on the display screen of the client terminal 4. In this menu screen, various types of buttons to perform various process relating to a project are prepared. As the various types of buttons, for example, there are the buttons for a "new registration of project", a "creation of project", a "call for project", a "registration of template", a "call for template", a "call for trading history", an "execution", a "cancel", a "return", and so on.

Here, when the "creation of project" button is operated by the project manager, the CPU41 displays a new project input screen (not shown) having an input column for a project number, an input column for a delivery date, and a pull-down menu to select a customer on the display screen.

For example, when "0000002" is inputted to the input column for the project number of the new project input screen from the input device 45, "2004/3/12" is inputted to the input column for the delivery date, a planning operation is select operated from the pull-down menu, and the execute button is click operated, then the CPU41 accesses the management DB1 via the application server 3, refers to the trading results information in the past of the WBS management DB21 and the result DB15, calls for the template of the corresponding customer based on the trading results information in the past, expands a called first template (hereinafter, denoted by "designed schedule template") and a copy of the designed schedule template, namely, a second template being an object of application of the new project information (hereinafter, denoted by "result of designed schedule automatic creation") to the memory 42, and thereby, as shown in FIG. 8 (1), the designed schedule template and the result of designed schedule automatic creation are created. At this time, these two are the same thing.

The CPU41 sets the project name "0000002" and the delivery date "2004/3/12" inputted from the above-stated input columns to the result of designed schedule automatic creation.

In the designed schedule template, a "number of days until delivery date", is set in advance, so the CPU41 sets the date tracing back the number of days until delivery date, from the delivery date of "2004/3/12" with the actual working days except holidays with reference to the calendar DB16 of the management DB1, as a scheduled completion date, to the result of designed schedule automatic creation. In this example, "0 (zero)" is set as the "number of days until delivery date", and therefore, the delivery date and the scheduled completion date are the same date, and "2004/3/12" is set in the scheduled completion date.

Next, as shown in FIG. 8 (2), the CPU41 sets the lead time "9" of the phase A which is set in the designed schedule template to the result of designed schedule automatic creation.

Subsequently, the CPU41 traces back the lead time "9" from the scheduled completion date "2004/3/12", and thereby, as shown in FIG. 8 (3), the scheduled start date "2004/3/2" is set to the result of designed schedule automatic creation. At this time, the CPU41 refers to the calendar DB16, calculates back the number of days with the actual working days except holidays, and works out the scheduled start date of the project. In this example, when 9 days are traced back from the scheduled completion date "2004/3/12", the scheduled start date becomes to be "2004/3/2" converted with the actual working days because two days, March, 7 and March, 6 are set as holidays in the calendar DB16 in FIG. 6.

The CPU41 follows the setting procedure of the phase A stated above, sets the scheduled start dates, the scheduled completion dates, and the lead times of processes/tasks in the lower hierarchies to the result of designed schedule automatic creation, and finally, as shown in FIG. 9, creates a new project information in which the designed schedule of the template is traced back from the delivery date, and makes it the designed schedule in actual working days considering holidays.

Next, a schedule change operation process by the operation of the Gantt chart is described with reference to FIG. 10 to FIG. 13. Incidentally, in this planning operation management support system, the client software installed in the client terminal 4 executes the schedule change process to shorten the delivery date in the following procedure. The client software is a program executed on the client terminal 4, and it is described as an operation of the CPU41 being a hardware of the client terminal 4, in the following explanation.

For example, when the delivery date becomes earlier by a request from the customer, and so on, the project manager clicks the button of the "call of project" from the menu screen (not shown) of the client terminal 4. Subsequently, a list of projects already in progress is shown. The project manager clicks the project requested by the customer from among the list of the projects, and then, the CPU41 displays the Gantt chart of the corresponding customer on the display screen, as shown in FIG. 10.

In this Gantt chart, fields of a task name, a person in charge, a start date, a completion date, and dates are provided on the horizontal axis. On the vertical axis, the respective persons in charges of the respective phases, processes, and the tasks are provided. In the date fields by the respective persons in charges, graphs of time schedules extending horizontally are displayed.

That is to say, the Gantt chart has process flows constituted by plural hierarchies, and actual works are assigned to small process flows of a hierarchy called as a "task" of the bottom layer. A process flow of an upper hierarchy of a task is called as a "process", and it is a hierarchy of a middle process flow organizing the lower tasks. A process flow of an upper hierarchy of a process is called as a "phase", and it is a hierarchy of the uppermost process flow organizing the lower processes. Each task has a person in charge, a scheduled start date, a scheduled completion date, a start date, and a completion date, and they are shown as graphs (bar) of time schedules in a horizontal direction of the periods passed to the scheduled start date, the scheduled completion date, the start date, and the completion date on the Gantt chart.

Besides, between the tasks, there is a dependency relation of completion-start, and there is a condition that a next task cannot be started unless a former task is completed. For example, in FIG. 10, there are dependency relations of a task A1 to a task A2, a task A2 to a task A3, and a task B2 to a task B3, and they show that the next task cannot be started unless at least the former task is completed. As the dependency relation of tasks, the relation that the next task cannot be started unless the former task is completed is ideal.

In shortening a delivery date, a task whose process flow can be shortened while keeping the dependency relation between tasks is searched, and then, the following processes are executed to shorten the lead time of the searched task.

Figure 11:
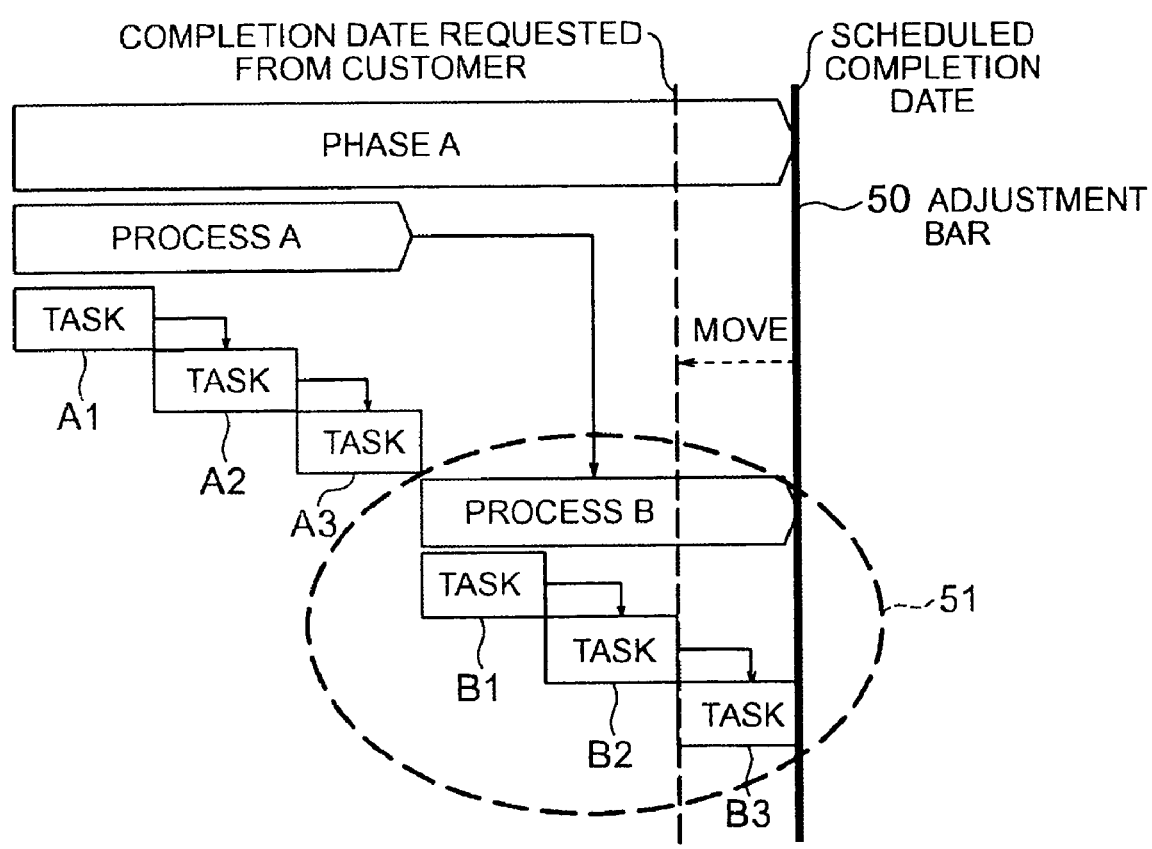
FIG. 11 is a view showing a change operation to shorten a delivery date on a Gantt chart.

The project manager selects, for example, a graph of a time schedule of the phase A in the Gantt chart of the customer displayed on the display screen, and then, operates the button of "change of delivery date" displayed at a lower portion of the screen, an adjustment bar 50 is displayed at a position of the scheduled completion date (vertical axis) being the current delivery date of the Gantt chart, as shown in FIG. 11. When this adjustment bar 50 is moved to the desired date by using a mouse, and so on, namely, the completion date being the delivery date requested from the customer, by a drag and drop operation, the CPU41 searches for the executing project information database group in the management DB1 (S101 in FIG. 13), for the object of an adjustment to be a not-processed task (third hierarchy) and the lead time is two days or more. Incidentally, as for tasks of which lead times are less than two days, they are excluded from the object as a rule, because it is difficult to shorten more than that.

By this search, the tasks being the object of adjustment are searched. In FIG. 11, within the range surrounded by a dotted line 51, there are the tasks being the object of the process change. The object of the task to be adjusted is searched, and then, the CPU41 calculates the number of days to be shifted in the actual working days except holidays with reference to the calendar DB16 (S102).

Subsequently, the CPU41 calculates the total lead time of the entire task (third hierarchy) (S103). After that, the CPU41 performs a calculation of ((number of days of lead time of each task)/(total lead time))×shifted days, sets a new lead time by subtracting the calculated result from the original lead time of each task (S104), and updates the Gantt chart with the newly set lead time (S105). Incidentally, in the above-described calculation, half adjust is applied for the digits after the decimal point. However, this management can be changed appropriately by a manager of the planning operation management support system according to the present invention.

After the Gantt chart is updated, the CPU41 confirms whether the scheduled completion date of the final work items are accommodated before the delivery date or not by the updated new lead time (S106), and when the scheduled completion date of the project of the updated Gantt chart is accommodated in the delivery date (Yes of S106), the batch correction is completed.

On the other hand, when the scheduled completion date of the final work items of the updated Gantt chart is not accommodated before the delivery date (No of S106), the CPU41 redefines the number of days exceeding the delivery date as the shifted days (S107), the number of repetition process N is set as one to the memory 42, and the process is repeated from the above-stated S103.

When the process is repeated for a predetermined number of times, for example, for two times, but it is not accommodated in the delivery date (Yes of S109), the CPU41 shortens the lead time of the task having a long lead time from a topside for one day (S110).

After the lead time is shortened, the CPU41 sets the number of repetition process as zero to the memory 42 (S111), and the process is repeated from the update of the Gantt chart in S105.

As stated above, the process is repeated so as to be accommodated in the delivery date, and when the task to be changed does not exist, the batch correction process of lead time is completed.

Figure 12:
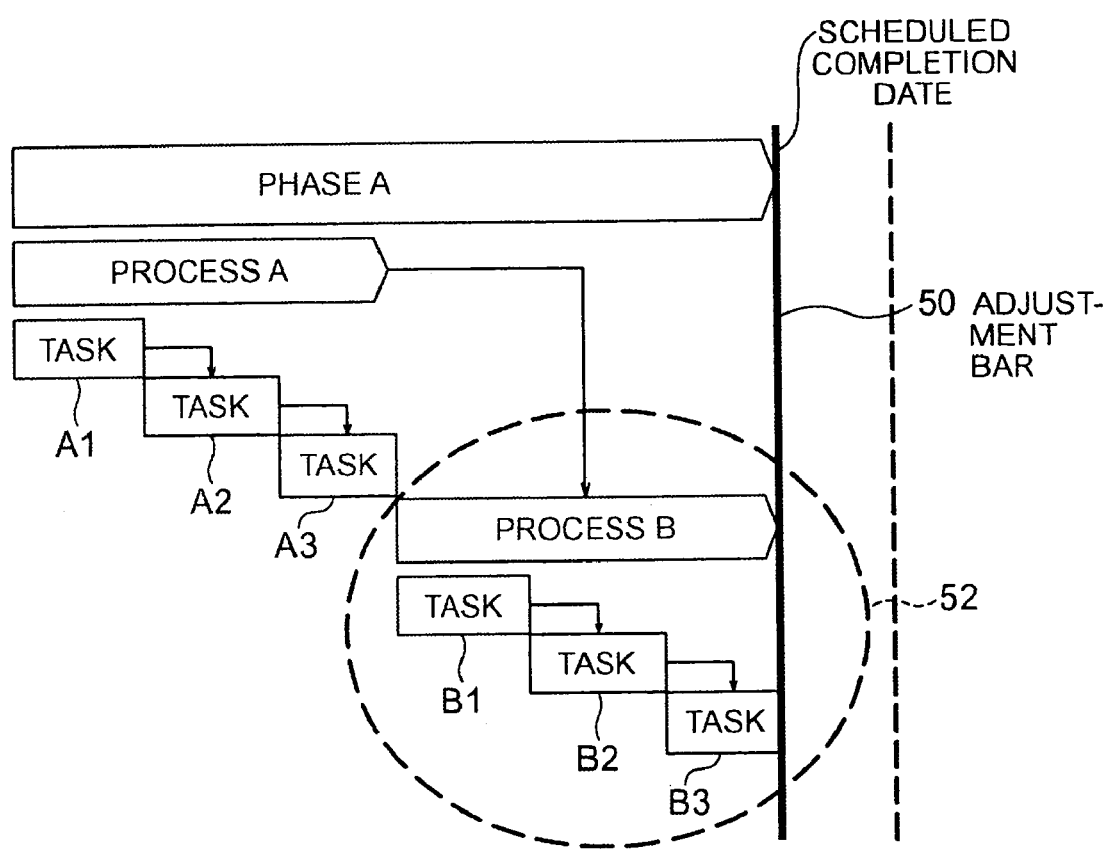
FIG. 12 is a view showing the Gantt chart in which the delivery date is shortened by the change operation.
Figure 13:
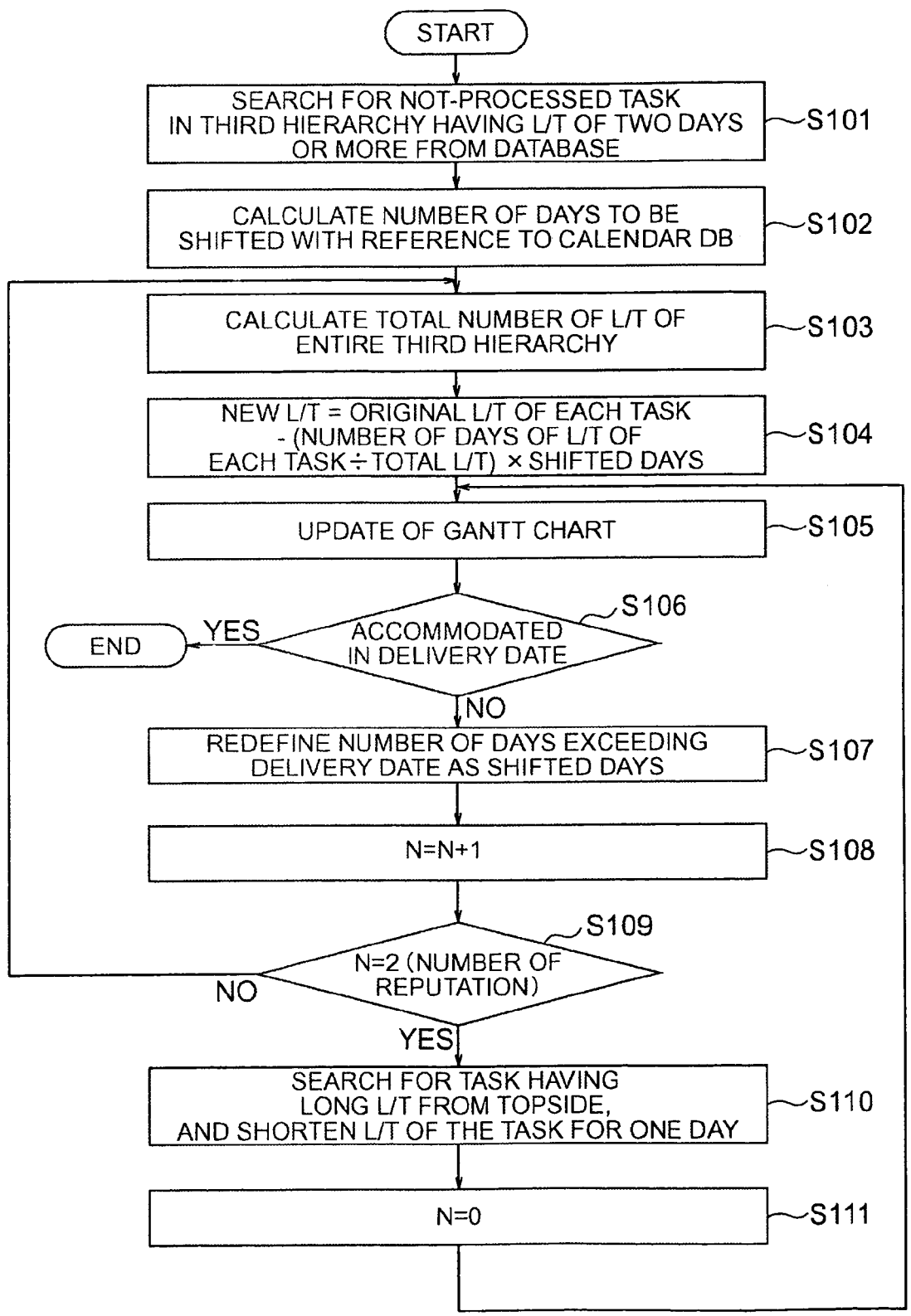
FIG. 13 is a flow chart showing a delivery date shortening process flow executed on the client terminal.

As a result, as shown in FIG. 12, the Gantt chart changed to the time schedule after correction is displayed, the corresponding every task is accommodated in the delivery date requested from the customer, and the date becomes to be the scheduled completion date. In FIG. 12, the lead time of the tasks within the range surrounded by a dotted line 52 are shortened, and the lead time of the parent processes relating to this, and further the lead time of the phases being the parent thereof are changed.

The CPU41 stores and manages the data of the project before correction and after correction, of which delivery date is changed, to the result DB15 in the hard disk device 33 of the application server 3 via a LAN2 as changed histories. In addition to this, it can also be configured so that the data before and after the correction in which the delivery date is once changed at the client terminal 4, are stored and managed in the hard disk device 43 of the client terminal 4 as changed histories, and thereafter, the CPU41 synchronizes the data before and after the correction in which the delivery date is changed stored in the hard disk device 33 of the application server 3.

Next, a concrete change in the Gantt chart in accordance with the move operation of the adjustment bar 50 is explained with reference to FIG. 14 to FIG. 16. Here, a case when the delivery date is shortened for two days is described.

Figure 14:
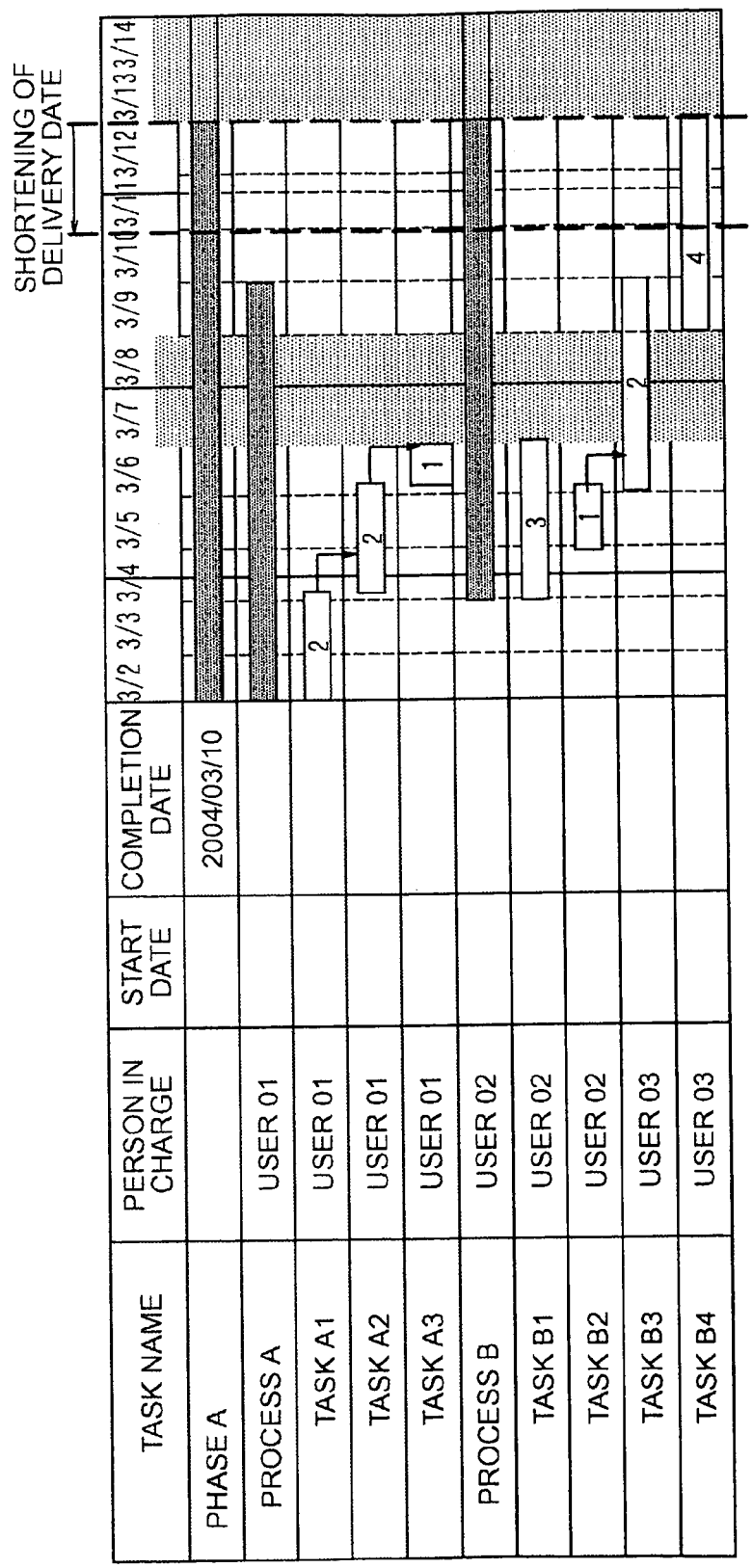
FIG. 14 is a view explaining a concrete change of the Gantt chart in accordance with a move operation of an adjustment bar.

(1) When the Gantt chart shown in FIG. 14 is that of before correction, and when the adjustment bar (not shown) is operated by the input device 45 such as a mouse of the client terminal 4, the CPU41 searches for the objective work items to be adjusted and selects them. In this case, a task A1, a task A2, a task B1, a task B3, and a task B4 are the objective work items to be shortened.

(2) The number of days to be shifted is for two days.

(3) The total lead time of the entire task is calculated, and it becomes to be 15 days.

(4) Task A1=(two days/15 days)×two days=0.26
Task A2=(two days/15 days)×two days=0.26
Task B1=(three days/15 days)×two days 0.4
Task B3=(two days/15 days)×two days=0.26
Task B3=(four days/15 days)×two days=0.53

As a result, the task B4 is shortened for one day.

(5) At the time of this update, it is not accommodated in the delivery date, so the CPU41 executes the correction process of the second time. In this case, the task A1, the task A2, the task B1, and the task B4 are the objective tasks to be shortened.

(6) The number of days to be shifted is for one day.

(7) The total lead time of the entire task is calculated, and 14 days is obtained as a calculation result.

(8) Calculate the number of days to be shortened of each task.

Task A1=(two days/14 days)×one day=0.14
Task A2=(two days/14 days)×one day=0.14
Task B1=(three days/14 days)×one day=0.21
Task B4=(three days/14 days)×one day=0.21

Figure 15:
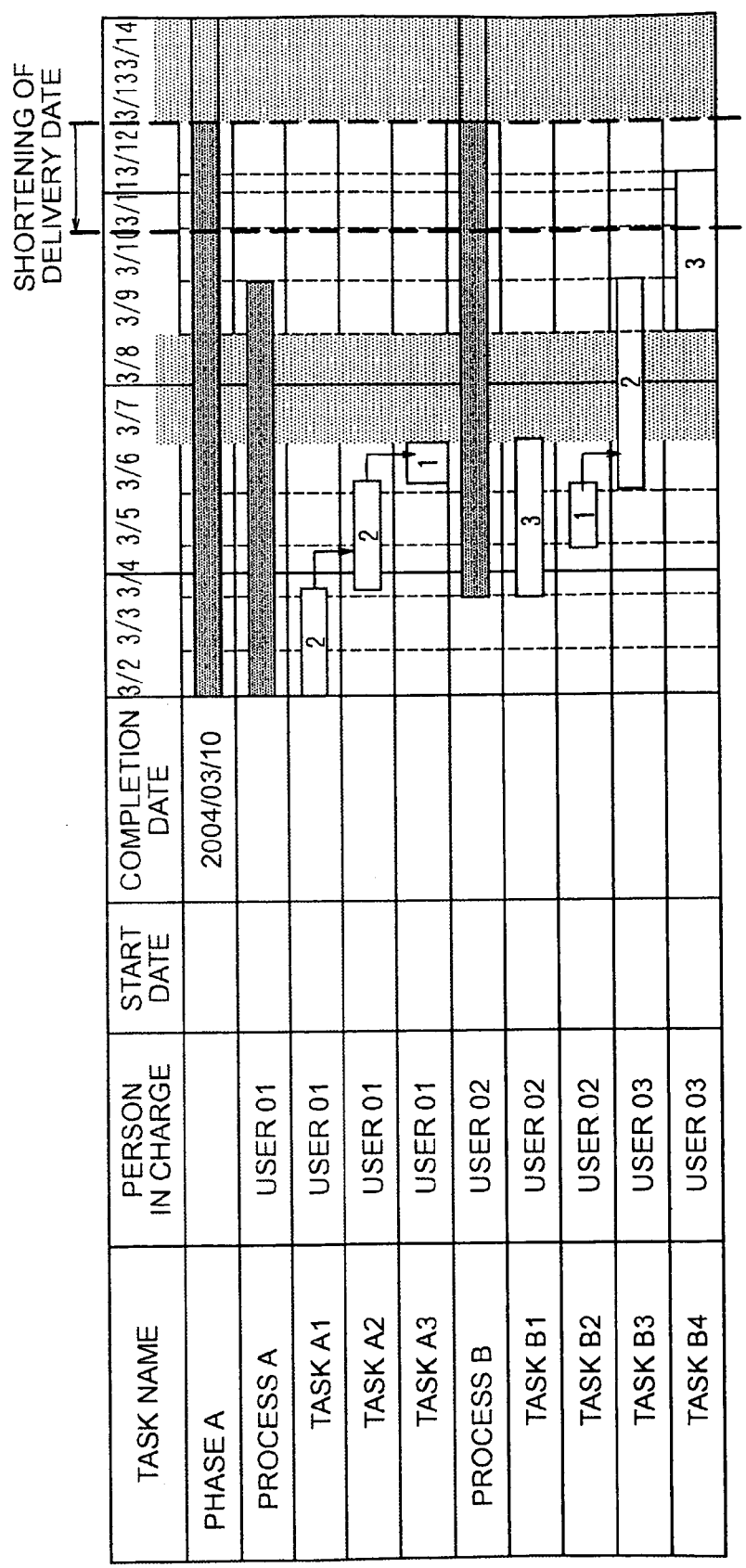
FIG. 15 is a view explaining the concrete change of the Gantt chart in accordance with the move operation of the adjustment bar.

As a result, as shown in FIG. 15, the Gantt chart is updated, but in this Gantt chart, it is not accommodated in the shortened delivery date, although the task B4 is shortened for one day. Therefore, the CPU41 executes the shortening process of the process flows according to the following shortening algorithm.

(9) It is not accommodated in the delivery date with a first shortening rule, and then, the lead time of the task having a long lead time is shortened for one day from the topside.

Task B1=(three days−one day)=two days
Task B4 =(three days−one day)=two days

Figure 16:
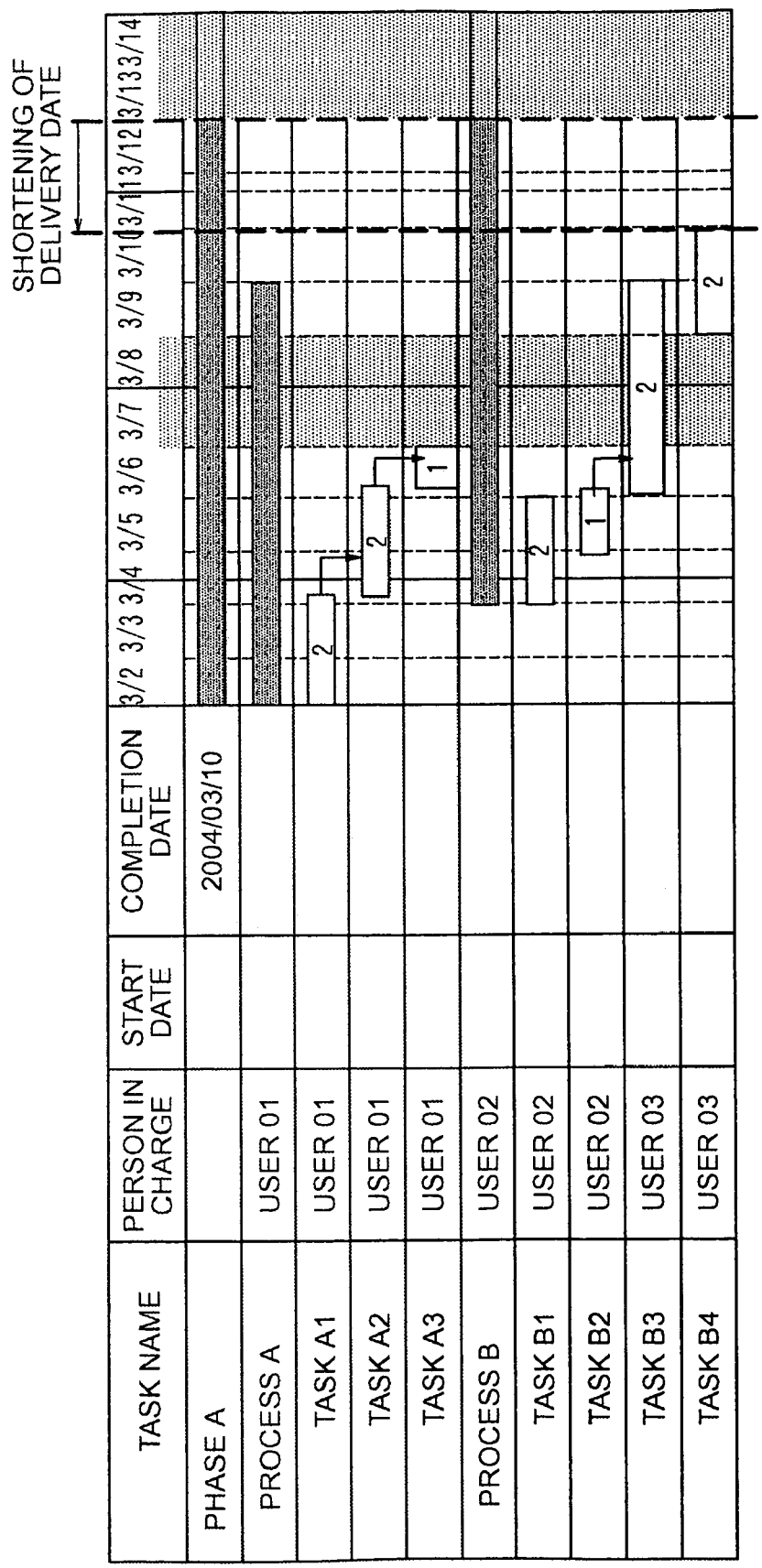
FIG. 16 is a view explaining the concrete change of the Gantt chart in accordance with the move operation of the adjustment bar.

(10) After the Gantt chart is updated, as shown in FIG. 16, in the displayed Gantt chart, the final completion date of the task, namely, the scheduled completion date of the project is accommodated in the shortened delivery date, the CPU41 completes the batch correction process of lead time.

According to the procedure stated above, the process flows having dependency relations such as the phase, the process, the task of the project are recalculated, and thereby, the process planning which is accommodated in the changed delivery date is created.

Next, a copy function of an existing project and a link function to other projects in the client terminal 4 of this planning operation management support system are described with reference to FIG. 17 to FIG. 20. As an operation of the copy function of the existing project, various embodiments are conceivable, but for example, when the information of a part of the work items (work plan) of the project information (planning operation) created by the above-stated scheduling automatic creation process is copied from the result DB15, or when a project manager creates a new project originally different from the above-stated scheduling automatic creation and some information of the existing work items are desired to be diverted, there is a case to copy from the result DB 15, and so on. Here, it is explained with a concrete example of the latter case.

Figure 17:
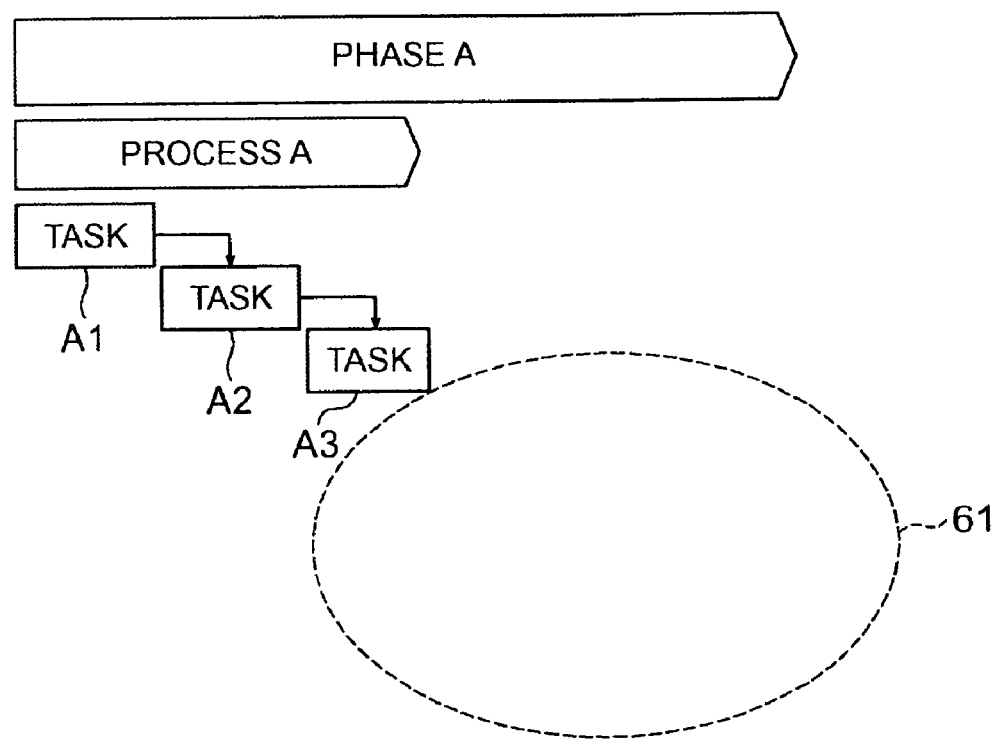
FIG. 17 is a view explaining a concrete change of a copy function of an existing project.

To newly create a project, for example, as shown in FIG. 17, after a phase A is newly created, a template of a process A is read out, and it is displayed on the screen. The process A has a task A1 to a task A3.

When a new project is created by editing the template of the process A, for example, by addition of the process, an inserting range (position) surrounded by a dotted line 61 is specified by a mouse operation, and so on. Incidentally, the operation to specify the insert position is, for example, when it is a two buttons mouse having buttons on left and right sides, the CPU41 displays an auxiliary menu of a specification of an insert position, a reference, an insertion, a specification of link, and so on, by a click operation of the right button, and therefore, the insert position can be specified by a specifying operation from this sub menu.

Figure 18:
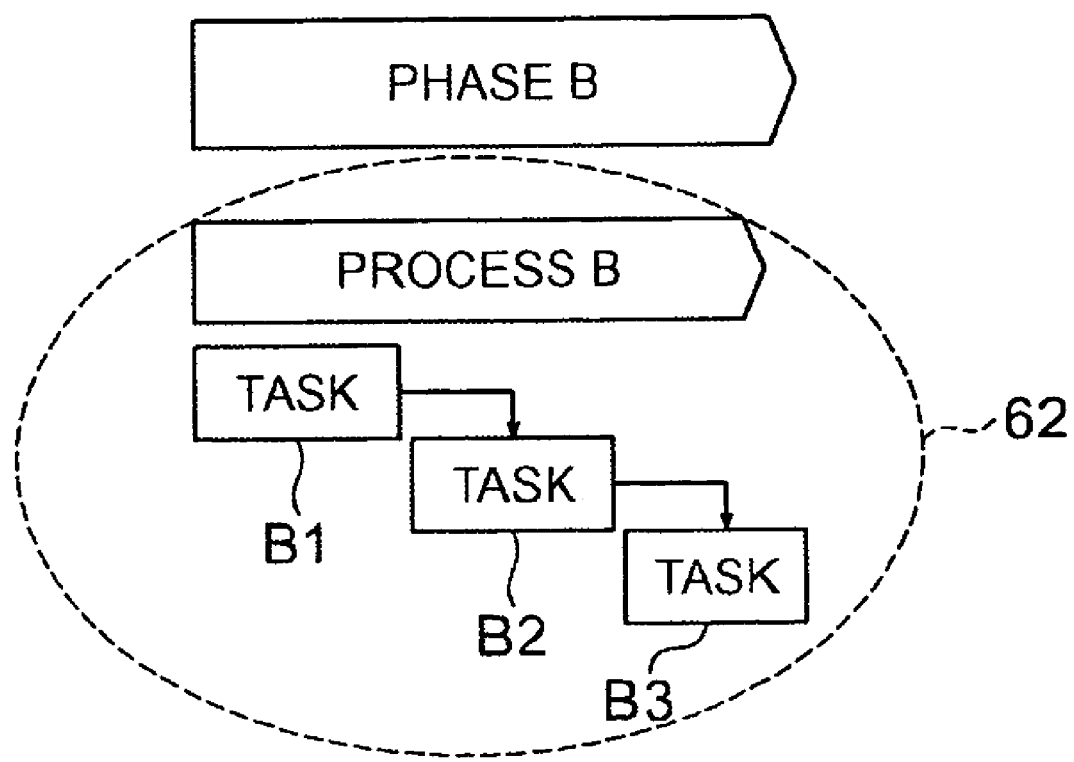
FIG. 18 is a view explaining the concrete change of the copy function of the existing project.

After the insert position is specified, when the reference operation is performed by the mouse from the above-stated sub menu, the CPU41 displays a reference screen of the other existing project. The project manager specifies a desired existing project by the mouse operation, and then, the corresponding existing project is displayed on a pop-up screen. In this case, for example, as shown in FIG. 18, a phase B having a task B1 to a task B3 is displayed.

Figure 19:
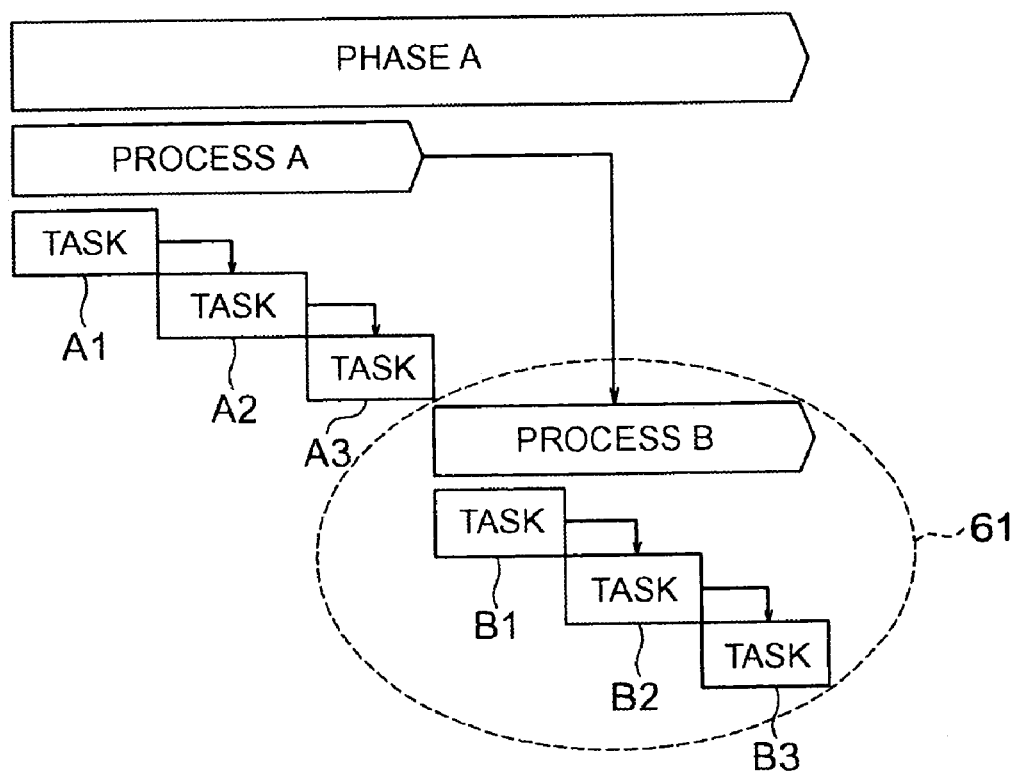
FIG. 19 is a view explaining a concrete change of a link function to the other project.

A desired range 62 among the phase/process/task of the existing other project displayed on this pop-up screen or the phase/process/task are specified by the mouse, the operation of insertion is performed by the right button of the mouse, and then, the CPU41 read out the corresponding phase/process/task from the result DB15 of the management DB1, and inserts to the insertion range 61 of the currently editing project. Herewith, as shown in FIG. 19, a process B is displayed at the back of the process A in an added form.

By using this copy function of the existing project, the project manager can easily create a new project by reading out a part of the template, and thereafter, the additional portion is copied from the other existing project and combining them, even when the template which is the same as the project coming to his/her head does not exist in the project information DB group for the template.

Besides, from the state of edit screen of the phase A shown in FIG. 17, the right button of the mouse is clicked, an addition of link is operated, and thereby, the CPU41 displays a specified screen or a reference screen (pull-down menu) of a link destination. The project manager makes a key entry or a specifying operation from the pull-down menu of a desired link destination, and then, the CPU41 accesses the corresponding link destination, and displays the reference screen of the project existing at the link destination. Next, the project manager specifies a desired project by the mouse operation, the corresponding project is displayed on the pop-up screen. In this case, for example, a phase C having a task C1 to a task C3 is displayed.

Figure 20:
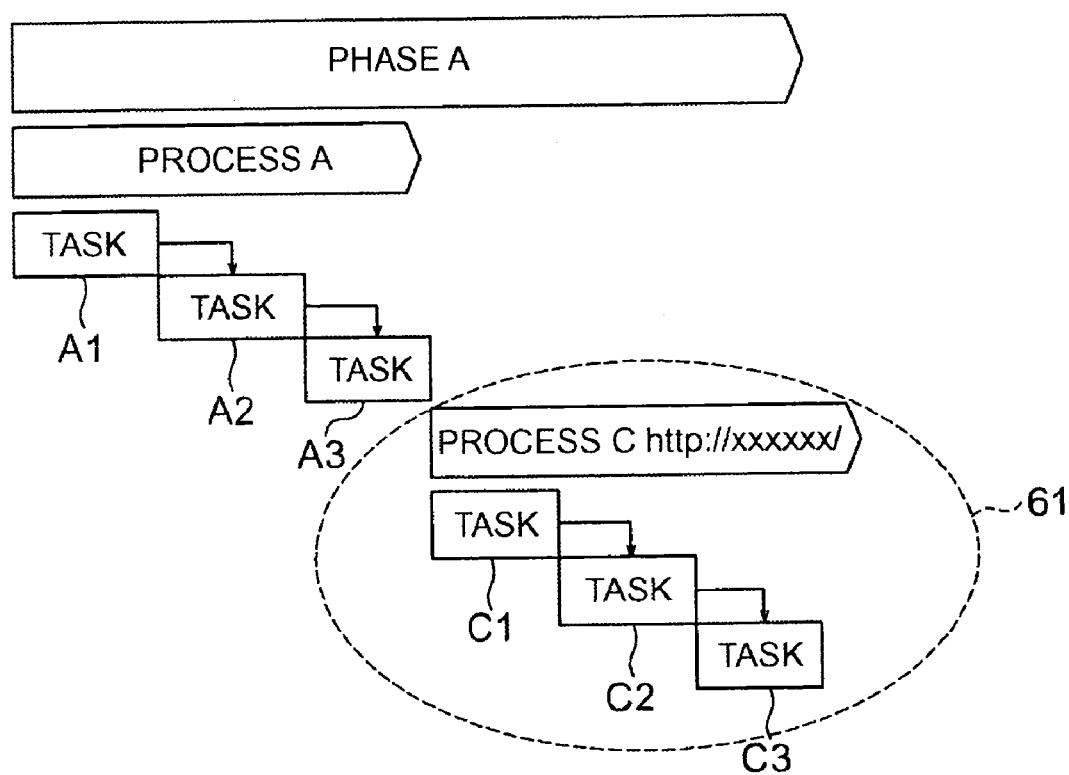
FIG. 20 is a view explaining the concrete change of the link function to the other project.

A desired range among the phase/process/task or the phase/process/task of the project at the link destination displayed on this pop-up screen is specified by the mouse, and the operation of insertion is performed by the right button of the mouse, then the CPU41 inserts the corresponding link information to the insertion range 61 of the currently editing project. That is to say, the link information is added to the insertion range 61. Herewith, as shown in FIG. 20, the process C in an added form to the back of the process A is displayed. In this case, the portion added by the link, namely the process C and the task C1 to the task C3 being the under layer thereof are displayed with a different color. Besides, as for the added portion, an actual result (project information) does not exist in the management DB1, and therefore, the CPU41 displays a master schedule screen of the phase/process/task of which link to other projects is set on the other screen, by making a click operation on the linked portion with the mouse.

As described above, by using the project link function, a new project can be created easily by linking to the project existing at the customer site even as for the project which is not self-designed.

As described above, according to the planning operation management support system 100 of the present embodiment, work processes are created from process flows managed by templates, and therefore, process flow creation works can be simplified. Besides, when a delivery date is changed by receiving a request to accelerate the delivery date from a customer, a function to correct the process flows so as to be accommodated in the changed period according to actual working days except holidays unique to the customer is provided, a Gantt chart with the process flows of the changed delivery date can be created accurately. For example, even when a sudden request to change the delivery date is occurred, not-processed work processes (process, task, and soon) are adjusted automatically with considering the actual working days and the actual working hours by each customer, and the processes flows accommodated in the period can be simulated precisely.

In the planning operation management support system 100 of this embodiment, task names, lead times and dependency relations between the respective tasks of a plurality of tasks are stored as templates by customers and by process flows. When a Gantt chart of a newly developed project is created, a template of a similar project is called to perform a creation of a new Gantt chart quickly. A selection of the template at this time is performed with reference to result information of trades with a customer in the past, and based on the results information, and an automatic creation of development process flows is performed. At this time, the respective tasks are allocated, and the process flows considered from the delivery date is created by calculating back from the completion date of the development phase of the newly developed project.

Besides, in the planning operation management support system 100 of this embodiment, when it comes to a state that a delivery date of a project has to be accelerated, tasks which complete after the accelerated delivery date are searched, a new lead time are set to the task, and the process flows in time for the delivery date is created automatically.

At the time of an update of a task, a correction of a period is performed locally with reference to information of not-processed tasks, except for the tasks already completed.

In the planning operation management support system 100, a result of an adjustment of a delivery date of a project is historically managed as process flows of before correction and after correction, and a function to evaluate the process flows after adjustment is provided to the software (client soft, server soft) when the project is completed, and thereby, as for the history of the shortened process flows, redefinitions are performed to improve the accuracy of the process planning, such that the changed process flows having a high evaluation is preferentially applied as a template at the next time of scheduling automatic creation.

Incidentally, in the above-described embodiment, it is explained as an operation of the client terminal 4, but the same function as the client terminal 4 is also included in the application server 3.

Incidentally, the present invention is not limited to the specific forms described in the above-stated embodiment, but it is to be understood that all the changes and modifications without departing from the range of the following claims are to be included therein. For example, a batch correction function of a lead time and a link function to other projects are combined, and thereby, when a sudden acceleration request of a delivery date is received from a customer in outsourcer's project information, it may be configured so that the out sourced project information which is linked with the outsourcer's project information is also performed the process of the batch correction of lead time in conjunction with the acceptance of the request of the acceleration of the delivery date.

Besides, the configuration is also acceptable that an alarm message, saying that the outsourcer's project information is changed, is notified to a project manager of a linked out sourced project by an electrical mail, and so on, in conjunction with the acceptance of the request of acceleration of the delivery date from the customer.

What is claimed is:

1. A planning operation management support system which manages multilayer process flows in a planning operation, comprising:
    a template information storage storing setting information of a planning operation performed in past times, a name of process flows of the respective layers, a lead time required for the respective process flows, and a dependency relation between the process flows, as a template by the respective planning operations;
    a trading result information storage storing trading result information with a customer in past times by the respective planning operations;
    a calendar storage storing calendar information in which actual working day when a worker in charge of the respective process flows carries on a work and holiday are set by the respective planning operations;
    an input unit accepting an input of a name of the customer, a name of the planning operation, and a delivery date to the customer, as a condition to make a process planning of a new planning operation;
    a template calling unit calling the template of the planning operation stored in said template information storage with reference to the trading result information stored in said trading result information storage, when the name of the customer, the name of the planning operation, and the delivery date are accepted by said input unit;
    a setting unit setting the name of the planning operation and the delivery date to the template called by said template calling unit to generate the new planning operation;
    a completion date calculating unit calculating a completion date of each process flow of the new planning operation based on the delivery date set in the template, the setting information showing a number of days from a completion of the process planning to the delivery date set in the template in advance, and the calendar information of said calendar storage;
    a planning operation information creation unit creating information of the new planning operation by allocating the respective process flows to the new planning operation based on the completion date, the lead time of the respective process flows set in the template in advance and the calendar information, and by calculating back a start date of the new planning operation; and
    a Gantt chart display unit displaying a Gantt chart on a screen based on the information of the new planning operation created by said planning operation information creation unit.

2. The planning operation management support system as set forth in claim 1, further comprising:
    an adjustment bar display unit displaying an adjustment bar which performs a change of the delivery date to the Gantt chart displayed on the screen;
    a first reallocation unit searching for not-processed process flows in a hierarchy falling within a date when the adjustment bar is moved to the arbitrary date on the Gantt chart, calculating a number of days of searched individual process flows with reference to the calendar information with actual working day, calculating a lead time as an entire hierarchy by adding up the number of days of the calculated respective process flows, calculating a new lead time of the respective process flows based on the lead time of the entire hierarch and a number of shifted days, and reallocating the respective process flows with the calculated lead time.

3. The planning operation management support system as set forth in claim 2, further comprising:
    a second reallocation unit performing a reallocation of the process flows reallocated by said first reallocation unit, by searching for a task having a long lead time from a topside, subtracting the lead time of the search task for one day, when the process flows are not accommodated in the changed delivery date as a result of the reallocation of the process flows by said first reallocation unit.

4. The planning operation management support system as set forth in claim 1, further comprising:
    a planning operation information copy unit inserting a specified other work plan to the Gantt chart showing the information of the new planning operation, when the existing other work plan of the planning operation is specified while editing the information of the new planning operation created by said planning operation information creation unit.

5. The planning operation management support system as set forth in claim 1, further comprising:
    a planning operation information link unit linking the information of the new planning operation created by said planning operation information creation unit with the other planning operation information; and a linked planning operation information display unit displaying the other planning operation information linked by said planning operation information link unit to the Gantt chart showing the information of the new planning operation in parallel.

6. A planning operation management support program for operating a planning operation management support system, which manages multilayer process flows in a planning operation, the program makes the planning operation management support system perform functions comprising:

a template information storage function storing setting information of a planning operation performed in past times, a name of process flows of the respective layers, a lead time required for the respective process flows, and a dependency relation between the process flows, as a template by the respective planning operations;

a trading result information storage function storing trading result information with a customer in past times by the respective planning operations;

a calendar storage function storing calendar information in which actual working day when a worker in charge of the respective process flows carries on a work and holiday are set;

an input function accepting an input of a name of the customer, a name of planning operation, and a delivery date to the customer, as a condition to make a process planning of a new planning operation;

a template calling function calling the template of the planning operation stored in said template information storage function with reference to the trading result information stored in said trading result information storage function, when the name of the customer, the name of the planning operation, and the delivery date are accepted by said input function;

a setting function setting the name of the planning operation and the delivery date to the template called by said template calling function to generate the new planning operation;

a completion date calculating function calculating a completion date of each process flow of the new planning operation based on the delivery date set in the template, the setting information showing a number of days from a completion of the process planning to the delivery date set in the template in advance, and the calendar information of said calendar storage function;

a planning operation information creation function creating information of the new planning operation by allocating the respective process flows to the new planning operation based on the completion date, the lead time of the respective process flows set in the template in advance and the calendar information, and by calculating back a start date of the new planning operation; and a Gantt chart display function displaying a Gantt chart on a screen based on the information of the new planning operation created by said planning operation information creation function.

7. The planning operation management support program as set forth in claim 6, the functions further comprising:

an adjustment bar display function displaying an adjustment bar which performs a change of the delivery date to the Gantt chart displaying on the screen;

a first reallocation function searching for not-processed process flows in a hierarchy falling within a date when the adjustment bar is moved to the arbitrary date on the Gantt chart, calculating a number of days of searched individual process flows with reference to the calendar information in actual working day, calculating a lead time as an entire hierarchy by adding up the number of days of the calculated respective process flows, calculating a anew lead time of the respective process flows based on the lead time of the entire hierarchy and a number of shifted days, and reallocating the respective process flows into the calculated lead time.

8. The planning operation management support program as set forth in claim 7, the functions further comprising:

a second reallocating function performing a reallocation of the process flows by said first reallocation function, by searching for a task having a long lead time from a topside, subtracting the lead time of the search task for one day, when the process flows are not accommodated in the changed delivery date a s a result of the reallocation of the process flows by said first reallocation function.

9. The planning operation management support program as set forth in claim 6, the functions further comprising:

a planning operation information copy function inserting a specified other work plan to the Gantt chart showing the information of the new planning operation, when the existing other work plan of the planning operation is specified while editing the information of the new planning operation created by said planning operation information creation function.

10. The planning operation management support program as set forth in claim 6, further comprising:

a planning operation information link function linking the information of the new planning operation created by said planning operation information creation function with the other planning operation information; and a linked planning operation information display function displaying the other planning operation information linked by said planning operation link function additionally, to the Gantt chart showing the information of the new planning operation.

* * * * *

UNITED STATES PATENT AND TRADEMARK OFFICE
CERTIFICATE OF CORRECTION

PATENT NO.       : 7,039,480 B2                              Page 1 of 1
APPLICATION NO.  : 11/086226
DATED            : May 2, 2006
INVENTOR(S)      : Ooshima et al.

It is certified that error appears in the above-identified patent and that said Letters Patent is hereby corrected as shown below:

Claim 2, column 18, line 41, change "hierarch" to --hierarchy--.

Claim 7, column 20, line 18, change "a anew" to --a new--.

Claim 8, column 20, line 30, change "a s a" to --as a--.

Signed and Sealed this

Eighth Day of August, 2006

JON W. DUDAS
*Director of the United States Patent and Trademark Office*